United States Patent
Bufetov et al.

(10) Patent No.: US 6,625,180 B2
(45) Date of Patent: Sep. 23, 2003

(54) RAMAN FIBER LASER

(75) Inventors: Igor Alexeevich Bufetov, Moskovskaya oblast (RU); Evgeny Mikhailovich Dianov, Moscow (RU); Andrei Semenovich Kurkov, Moscow (RU)

(73) Assignee: Nauchny Tsentr Volokonnoi Optiki Pri Institute Obschei Fiziki Rossiiskoi Akademii Nauk, Moscow (RU)

( * ) Notice: Subject to any disclaimer, the term of this patent is extended or adjusted under 35 U.S.C. 154(b) by 137 days.

(21) Appl. No.: 09/776,296

(22) Filed: Feb. 2, 2001

(65) Prior Publication Data

US 2001/0010696 A1 Aug. 2, 2001

(30) Foreign Application Priority Data

Feb. 8, 2000 (RU) .......................................... 2000102824

(51) Int. Cl.[7] .................................................. H01S 3/30
(52) U.S. Cl. .............................. 372/3; 372/6; 372/102; 372/99
(58) Field of Search ............................... 372/3, 6, 102, 372/92, 95, 98–99

(56) References Cited

U.S. PATENT DOCUMENTS

| | | | |
|---|---|---|---|
| 5,323,404 A | | 6/1994 | Grubb |
| 5,815,518 A | * | 9/1998 | Reed et al. ............... 372/6 |
| 5,838,700 A | | 11/1998 | Dianov et al. |
| 6,163,552 A | * | 12/2000 | Engelberth et al. ........... 372/3 |
| 6,163,554 A | * | 12/2000 | Chang et al. ................ 372/6 |
| 6,181,465 B1 | * | 1/2001 | Grubb et al. .............. 359/337 |
| 6,295,304 B1 | * | 9/2001 | Koch et al. ................. 372/6 |
| 6,301,271 B1 | * | 10/2001 | Sanders et al. .............. 372/3 |
| 6,310,899 B1 | * | 10/2001 | Jacobovitz-Veselka et al. 372/6 |
| 6,407,855 B1 | * | 6/2002 | MacCormack et al. ..... 359/346 |
| 6,434,172 B1 | * | 8/2002 | DiGiovanni et al. ........... 372/6 |

OTHER PUBLICATIONS

Gouveia–Neto, "Modulation Instability and Soliton–Raman Generation in P205 Doped Silica Fiber", Lightwave Technology, Journal of, vol. 10 Issue. 11, Nov. 1992, pp. 1536–1539.*

Dianov et al. "CW highly efficient 1.24 mm Raman laser based on low–loss phosphosilicate fiber", Optical Fiber Communication Conference, 1999, and the International Conference on Integrated optics and Optical Fiber Communication, OFC/IOOC '99, Technical D.*

Dianov et al., "Medium–Power CW Raman Fiber Lasers", Selected Topics in Quantum Electronics, IEEE Journal on, vol. 6, Issue 6, Nov.–Dec. 2000, pp. 1022–1028.*

(List continued on next page.)

Primary Examiner—Eddie Lee
Assistant Examiner—José R. Díaz
(74) Attorney, Agent, or Firm—Barnes & Thornburg

(57) ABSTRACT

The invention relates to the field of laser engineering and fiber optics and is industrially used to pump optical amplifiers used in wide band fiber-optical communication systems. The subject matter of the invention is a Raman fiber laser based on a phosphosilicate fiber, comprising a pumping radiation source 1, a length 2 of a phosphosilicate fiber, at least two pairs of Bragg gratings as reflectors 3 and 4, wherein each pair of Bragg gratings forms an optical resonator, wherein the transmission of energy between the resonators is effected due to stimulated Raman scattering, both at relatively high frequency intramolecular oscillations, related to the presence of phosphorus oxide in the fiber (the frequency difference of such resonators being selected from the range of 1305–1355 $cm^{-1}$), and at relatively low frequency oscillations related to a silicate matrix of the fiber, the shift of frequencies between such resonators being selected from the range of 50–560 $cm^{-1}$.

6 Claims, 3 Drawing Sheets

OTHER PUBLICATIONS

Dianov et al., "Phosphosilicate fiber: simple high–power cw 1.24– and 1.48– mm Raman lasers", Lasers and Electro–Optics, 1998, CLEO 98, Technical Digest, Summaries of papers presented at the Conference on, 1998, p. 225.*

Dianov et al., "High–efficient 1.3 mm Raman fiber amplifier", Optical Fiber Communication Conference and Exhibit, 1998, OFC '98, Technical Digest, 1998, pp. 33–34.*

Dianov et al., "CW high power 1.24 mm and 1.48 mm Raman lasers based on low loss phosphosilicate fibre", Electronics Letters, vol.: 33 Issue: 18, Aug. 28, 1997, pp. 1542–1544.*

Dianov et al., "New generation of Raman fiber lasers, based on phosphosilicate fibers", Lasers and Electro–Optics Europe, 2000. Conference Digest. 2000 Conference on , 2000, pp. 17.00 CtuM4.*

Prabhu et al., "4.11 W Raman fiber laser at 1239 nm using phosphosilicate fiber", lasers and electro–Optics, 200, CLEO 2000, Conference on 200, p. 544.*

"Quantum Theory of Stimulated Raman Scattering"; pp. 143–145.

"Stimulated Raman Scattering" Chapter 8—pp. 218 228.

"High–power Single–Mode Neodymium Fibre Laser", by M.Dianov et al, Quantum Electronics 1997, pp. 1–2.

"The Principle of Non–linear Optics—Stimulated Raman Scattering", Y. R. Shen; 1984, pp. 141–186 (Ch. 10).

* cited by examiner

RAMAN FIBER LASER

FIELD OF THE INVENTION

The present invention relates to the field of laser engineering and fiber optics and is industrially applicable in fiber communication systems for pumping optical amplifiers used in wide-band fiber-optical communication systems. Furthermore, the proposed device may be used as a source of radiation in fields where the spectral-selective action of radiation on a substance in the near infrared range is required, in particular in medicine, and also for diagnosis of the environment, in chemistry.

BACKGROUND OF THE INVENTION

It is well known that the effect of stimulated Raman scattering (the scattering of light on intramolecular oscillations) may be used to amplify optical radiation (see Y. R. Shen, The Principles of Nonlinear Optics, A Wiley-Interscience Publication John Wiley & Sons, New York-Chichester-Brisbane-Toronto-Singapore, © John Wiley & Sons, Inc., 1984, chapter 10, pp. 141–186.

In the specification of the proposed device the concept of Raman amplification factor in a voluminous sample of the material and in a single-mode fiber with a core and cladding of a predetermined makeup is given substantial consideration.

Here and below the Raman amplification factor $G_R$ is understood to mean the Raman amplification factor in a voluminous material, as it is defined, for example, in Y. R. Shen, The Principles of Nonlinear Optics, A Wiley-Interscience Publication John Wiley & Sons, New York-Chichester-Brisbane-Toronto-Singapore, © John Wiley & Sons, Inc., 1984, chapter 10, pp. 143–146.

The Raman amplification factor in a fiber $g_o$ is used to describe the amplification properties of fiber in particular. This amplification factor is related to the value $G_R$ for the material of the core of the fiber by the relationship $g_o = G_R / A_{eff}$, where $A_{eff}$ is the effective area of the core of the fiber (see, for example, Govind P. Agrawal, Nonlinear Fiber Optics, [Quantum electronics—principles and applications], Academic Press, Inc., Harcourt Brace Jovanovich, Publishers, Boston-San Diego-New York-Berkley-London-Sydney-Tokyo-Toronto, 1989, Chapter 8, pp. 218–228). The dimension of the factor $g_o$ is 1/(m W) or dB/(km W). In particular, for a number of communication fibers, the value of $g_o$ was measured experimentally (V. L. da Silva, J. R. Simpson. Comparison of Raman Efficiencies in Optical Fibers. Conference on Optical Fiber Communications, 1994, OFC'94 Technical Digest, WK13, pp. 136–137, 1994) and was ~5 $10^{-4}$ 1/(mW) or, which is the same, ~2.2 dB/(km W).

Constructions of fiber lasers are known, the action of which is based on the effect of stimulated Raman scattering in a fiber, and which are actually converters of the frequency (or wavelength) of optical radiation. In particular, a Raman fiber laser based on a germanosilicate fiber is presented in the paper (S. G. Grubb, T. Strasser, W. Y. Cheung, W. A. Reed, V. Mizhari, T. Erdogan, P. J. Lemaire, A. M. Vengsarkar, D. J. DiGiovanni, D. W. Peckham, B. H. Rockhey. High-Power 1.48 μm Cascaded Raman Laser in Germanosilicate Fibers, Optical Ampl. and Their Appl., Davos, USA, 15–17 June 1995, pp. 197–199).

The five-stage Raman laser presented in this paper is designed to convert optical radiation with a wavelength of $\lambda_o=1.117$ μm (and frequency $\upsilon_o=8950$ cm$^{-1}$) into radiation having a wavelength of 1.48 μm (6760 cm$^{-1}$). GeO$_2$ is the main impurity dope in the core of the fiber. The pumping source is an ytterbium laser with a generation wavelength of 1.117 μm. The Raman fiber laser comprises five pairs of distributed Bragg fiber gratings as reflectors for the wavelengths $\lambda_1=1.175$ μm ($\upsilon_1=8511$ cm$^{-1}$), $\lambda_2=1.24$ μm ($\upsilon_2=8065$ cm$^{-1}$), $\lambda_3=1.31$ μm ($\upsilon_3=7634$ cm$^{-1}$), $\lambda_4=1.40$ μm ($\upsilon_4=7143$ cm$^{-1}$), $\lambda_5=1.48$ μm ($\upsilon_5=6760$ cm$^{-1}$), forming respectively 5 resonators enclosed one in another, which comprise a germanosilicate fiber, for the 1st, 2nd, 3rd, 4th and 5th Stokes components of the Raman scattering in a germanosilicate fiber. When pumping radiation is launched into the aforesaid germanosilicate fiber, amplification of the optical radiation in the frequency range shifted toward the long-wave side relative to the pumping radiation by a value of about 450 cm$^{-1}$ occurs due to the effect of stimulated Raman scattering. The magnitude of the shift and the bandwidth of the amplification are determined by the characteristics of the oscillations of molecules of the fiber material which is used in the Raman laser as the active medium, in this particular case by the properties of germanosilicate glass. When the value of the amplification of the optical radiation at a frequency of $\upsilon_1$ reaches some threshold value, laser generation occurs at that frequency. The 1st stage of the Raman laser works in this way. After initiation of generation at the frequency $\upsilon_1$, the radiation with the frequency $\upsilon_1$ will already serve as a pump for the Raman laser, the resonator of which is tuned to the frequency $\upsilon_2$, and so on to the fifth conversion stage. Thus, each stage of the Raman laser under consideration shifts the generation frequency by a value of ~450 cm$^{-1}$.

A drawback of this laser is the relatively low efficiency of radiation conversion in the 5th Stokes component, which is due to losses in the optical fiber at wavelengths of the Stokes components because of the large number of stages of conversion as a result of the small value of the Raman shift of the radiation frequency in standard fibers, in particular because of the presence of optical resonators in the short-wave range of the spectrum (in this particular case a 1.175 μm resonator), where, as is known, the optical losses in a fiber have a large value as compared with the range of about 1.55 μm.

U.S. Pat. No. 5,323,404, IPC H 01 S 3/30, published Jul. 21, 1994, comprises a disclosure of a similar device. It is noted here that a Raman laser of this type is capable of generating practically any predetermined wavelength due to the large relative width of the Raman amplification band in a germanosilicate fiber. But the device has the same drawback as in the preceding example.

The device most similar to the claimed device is the known Raman fiber laser disclosed in U.S. Pat. No. 5,838,700, IPC H 01 S 3/30, published Nov. 17, 1998, which comprises as the active medium a length of a fiber that comprises an oxide array on the base of SiO$_2$, the makeup of which includes phosphorus oxide, a laser with a generation wavelength of 1.0–1.1 μm as a pumping source, and two refractive index Bragg gratings as distributed reflectors for a wavelength range from 1.20 to 1.28 μm, forming a resonator for the first Stokes component and two more Bragg gratings as distributed reflectors for a wavelength range from 1.46 to 1.50 μm, forming a resonator for the second Stokes component. In accordance with the instant invention, at a pumping radiation wavelength of 1.0–1.1 μm, radiation with wavelengths of 1.2–1.28 μm and 1.46–1.50 μm may be obtained in Raman lasers on a phosphosilicate fiber as a result of only one- or two-stage conversion, respectively. As a result, a higher efficiency of conversion may be achieved than in a Raman laser based on a germanosilicate fiber (which is demonstrated, for example, in the paper of E. M. Dianov, I. A. Bufetov, M. M. Bubnov, A. V. Shubin, S. A. Vasiliev, O. I. Medvedkov, S. L. Semjonov, M. V. Grekov, V. M. Paramonov, A. N. Gur'yanov, V. F. Khopin, D. Varelas, A. Iocco, D. Constantini, H. G. Limberger, R. -P. Salathe, "CW Highly Efficient 1.24 µm Raman Laser Based on Low-loss Phosphosilicate Fiber," OFC'99, Technical Digest Series, Postdeadline Papers, PD-25, 1999). The spectrum of a spontaneous Raman scattering in a phosphosilicate fiber (see, for example, E. M. Dianov, M. V. Grekov, I. A. Bufetov, S. A. Vasiliev, O. I. Medvedkov, V. G. Plotnichenko, V. V. Koltashev, A. V. Belov, M. M. Bubnov, S. L. Semjonov and A. M. Prokhorov, "CW High Power 1.24 µm and 1.48 µm Raman Lasers Based on Low Loss Phosphosilicate," Electron. Lett., 33, 1542, 1997) comprises a line ~50 $cm^{-1}$ wide, the center of which is displaced relative to the pumping line b~1330 $cm^{-1}$, which corresponds to radiation scattering at relatively high frequency intramolecular oscillations related to phosphorus oxide. This value of the Raman shift of the frequency is ~3 times more than the Raman shift in a germanosilicate fiber. It is just this Raman band that is related to the presence of phosphorus oxide in the fiber that is used in the foregoing example to convert pumping radiation with a wavelength of about 1.06 µm to the ranges of 1.24 µm and 1.48 µm for one and two conversion stages, respectively.

A drawback of the prototype is the use of only the aforesaid narrow spectral Raman band of the Raman spectrum of the phosphosilicate fiber, this being related to the presence of phosphorus oxide in the core material, which does not make it possible in practice to obtain radiation of a predetermined arbitrary wavelength at the output of the Raman laser, even taking into account the possible region of readjustment of the usually used pumping radiation sources—ytterbium or neodymium lasers in the range of from 1.0 to 1.12 µm.

SUMMARY OF THE INVENTION

In accordance with the foregoing, the object of the present invention is to create a Raman fiber laser ensuring enhancement of the efficiency of conversion of the pumping radiation into radiation of a predetermined arbitrary wavelength in the range of from the pumping wavelength to 1.8 µm.

This result is achieved in that in a Raman fiber laser comprising: a length of a phosphosilicate fiber as the active medium, the makeup of the fiber including $SiO_2$, $P_2O_5$; a pumping source of optical radiation at a frequency of $\upsilon_o$; at least two pairs of Bragg gratings as reflectors, wherein each pair of Bragg gratings forms an optical resonator including at least a part of a length of the phosphosilicate fiber, while the frequency $\upsilon_o$ of the aforesaid pumping source of optical radiation and frequency of each optical resonator $\upsilon_i$, where i=1, . . . N, are set in such a manner that a portion of the values of the frequency differences $\Delta\upsilon_1=\upsilon_{i-1}-\upsilon_1$ belongs to the range of 1305–1355 $cm^{-1}$, the Raman amplification in which is due to the presence of $P_2O_5$ in a phosphosilicate fiber, while the remaining values of the frequency differences $\Delta\upsilon_1$ belong to the range of 50–560 $cm^{-1}$, the Raman amplification in which is due to the presence of $SiO_2$ in the phosphosilicate fiber, wherein there is at least one value of $\Delta\upsilon_i$ in each of the ranges.

Wherein, it is preferable that an additional Bragg grating with a radiation reflection factor at the frequency $\upsilon_o$ greater than 50% is disposed at the output of the Raman fiber laser.

Furthermore, the pumping radiation source may be made in the form of a neodymium fiber laser with a frequency $\upsilon_o$ selected from the ranges of 8930–9489 $cm^{-1}$, 10820–10870 $cm^{-1}$ and 7400–7700 $cm^{-1}$.

The pumping radiation source may be made in the form of an ytterbium fiber laser with a frequency $\upsilon_o$ selected from the range of 8900–10000 $cm^{-1}$.

In particular the concentration of $P_2O_5$ in the core of the aforesaid portion of the phosphosilicate fiber lies within the range of 8–15 mole %.

Furthermore, a compound of at least one chemical element of the group Ge, N, Ga, Al, F, Ti, B, Sn, S, may be additionally introduced into the makeup of the aforesaid length of the phosphosilicate fiber.

Thus, a specific feature of the proposed construction of the Raman laser based on a phosphosilicate fiber is the use of a Raman shift, related to the silicate matrix, in a number of stages of radiation frequency conversion.

The simultaneous use in a multistage Raman laser of at least two substantially different values of Stokes frequency generation shifts in different stages makes it possible, on the one hand, due to the use of stages with a large Stokes shift, to obtain radiation with a wavelength differing from the necessary by less than the value of the large shift (in this case ~1330 $cm^{-1}$) with the minimum necessary number of conversion stages. After that by means of one or two Raman conversion stages with frequency shifts taken from the range of 50–560 $cm^{-1}$, it is possible to obtain the exact value of the predetermined generation wavelength. Additional possibilities in the selection of the final wavelength of radiation conversion are provided by the selection of the pumping radiation wavelength of a neodymium fiber laser (in the range of from 1.055 to 1.10 µm) or an ytterbium fiber laser (from 1.05 to 1.12 µm).

In particular, in order to enhance the degree of use of pumping radiation in the scheme of a Raman laser based on a phosphosilicate fiber, an additional single Bragg grating may be introduced that has a high (greater than 50%) radiation reflection factor at a frequency $\upsilon_o$ and is positioned near the output of the Raman laser.

It is important that the Raman amplification factor has approximately equal values in both bands of the Raman spectrum of the phosphosilicate fiber (the value of $g_o$ for each range (1305–1355) $cm^{-1}$ and (50–560) $cm^{-1}$. In that case the optimum lengths of the fiber for each frequency conversion stage also have approximately equal values. This makes it possible to use one and the same length of the fiber as an active medium with a length close to the optimum length for all of the stages of the Raman laser, both with large (1305–1355) $cm^{-1}$ and with small (50–560) $cm^{-1}$ Raman frequency shift. Therefore, it is preferable to use a phosphosilicate fiber with a concentration of the phosphorus oxide lying within the range of 8–15 mole % as the Raman gain medium.

The use of high frequency and low frequency Raman frequency shifts simultaneously in one Raman laser makes it possible to obtain radiation of any predetermined wavelength in a range between the pumping radiation wavelength and ≈1.8 µm with a small number of Raman conversion stages and with high efficiency. In particular, a Raman laser based on a phosphosilicate fiber with pumping from ytterbium or neodymium fiber lasers makes it possible to obtain with high efficiency (≧50%) radiation frequency conversion from a pumping radiation wavelength of ~1000 nm to any wavelength in the range to 1.6 µm with no more than 3 conversion stages.

BRIEF DESCRIPTION OF THE DRAWINGS

The invention will be described on the example of a preferable embodiment with reference to the drawings, wherein identical elements in the drawings are designated by one and the same reference numerals. The following is shown in the drawings.

DESCRIPTION OF THE PREFERABLE EMBODIMENT OF THE INVENTION

Figure 1:
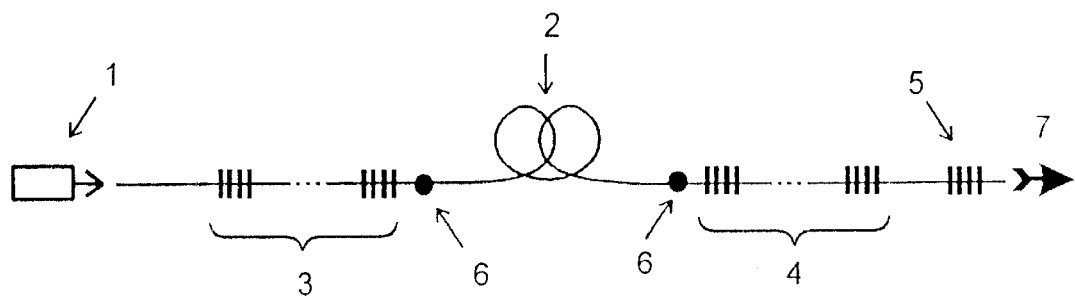
FIG. 1 shows schematically a preferable embodiment of the proposed Raman fiber laser.

An optical diagram of a Raman fiber laser, the number of pairs of Bragg gratings in which is equal to N, wherein N is equal to two or more, is presented in FIG. 1 as the preferable embodiment of the invention. This Raman laser carries out effective conversion of pumping radiation with a frequency $\upsilon_o$ into radiation with a frequency $\upsilon_N$.

Reference numeral 1 in FIG. 1 designates a source of radiation with a frequency $\upsilon_o$, which is a pumping radiation source for a Raman laser. Reference numeral 2 designates a length of a phosphosilicate fiber, which is an active medium of the Raman laser. Two groups of Bragg gratings, used as reflectors and forming optical resonators with frequencies $\upsilon_i$, where i=1, . . . , N, each of which comprises at least a part of the length of the phosphosilicate fiber, are designated in FIG. 1 by reference numeral 3 and reference numeral 4, respectively. Reference numeral 5 designates an additional Bragg grating at the output of the Raman fiber laser. Reference numeral 6 designates points of welding a length of a phosphosilicate fiber to lengths of fibers comprising refractive index Bragg gratings (if the Bragg gratings are not included directly in the length of the phosphosilicate fiber itself). Reference numeral 7 designates a point of radiation output with a frequency $\upsilon_N$.

Neodymium or ytterbium fiber lasers, radiating in a frequency range of 8900–10000 cm$^{-1}$, may be used as a pumping radiation source with a frequency of $\upsilon_o$ for a Raman laser (1). Furthermore, any other single-mode laser, generating radiation in a wavelength range of 0.5–1.7 μm, both fiber and based on voluminous elements, including crystals, doped with metal ions, may be used as a pumping source. Another Raman laser may also be used as a pumping radiation source. Two groups of refractive index Bragg gratings, included in the core of the fiber and designated by reference numerals 3 and 4, comprise N pairs of Bragg gratings (not shown in FIG. 1). These groups are divided by a length of a phosphosilicate fiber and each pair of Bragg gratings forms an optical resonator. The Bragg gratings perform the role of reflectors. Thus, there are N pairs of Bragg gratings (not shown in FIG. 1) in those two groups—one from group 3 and one from group 4, wherein the Bragg gratings of each pair are designed to reflect radiation within the range of one wavelength (the width of the spectral range in which the Bragg gratings reflect radiation preferably lies within the range of 0.1–5 nm, and the center wavelengths for each pair coincide as far as is provided by the exactness of production of these elements). Thus, each such pair of Bragg gratings forms an optical resonator, wherein each ith (i=1, . . . ,N) pair forms an optical resonator for its optical radiation frequency $\upsilon_i$. The value of $\upsilon_i$ is selected in such a manner that the difference $\Delta\upsilon_i=\upsilon_{i-1}-\upsilon_i$ would belong to either the interval 50–560 cm$^{-1}$ (in this case radiation at a frequency of $\upsilon_1$ is a Raman component related to stimulated scattering in a silicate matrix of a fiber-vitreous SiO$_2$), or to the interval 1305–1355 cm$^{-1}$ (in this case radiation at a frequency of $\upsilon_i$ is a Raman component related to the presence of phosphorus oxide in the makeup of the fiber). Wherein, in accordance with the invention, there is at least one value of $\Delta\upsilon_i$ in each of the ranges. The reflection factors of all of the Bragg gratings are close to 100%, except for the output grating in the resonator at a frequency of $\upsilon_N$, the reflection factor of which may be substantially less than 100% (for example 5%) in order to carry out the optimum emission of radiation at a frequency of $\upsilon_N$ from the resonator. The additional Bragg grating 5 is designed for a pumping radiation reflection factor close to 100% at a frequency $\upsilon_o$ in order to provide for at least dual passage of the pumping radiation along the length of the phosphosilicate fiber and, thus, more effective use of pumping radiation. All of the Bragg gratings may be included either directly in the phosphosilicate fiber (and such a variant is preferable from the point of view of reducing losses of optical radiation in the resonators of a multistage Raman laser), and in additional lengths of a special fiber, which are then welded to the length of the phosphosilicate fiber in points designated by reference numeral 6.

Figure 2:
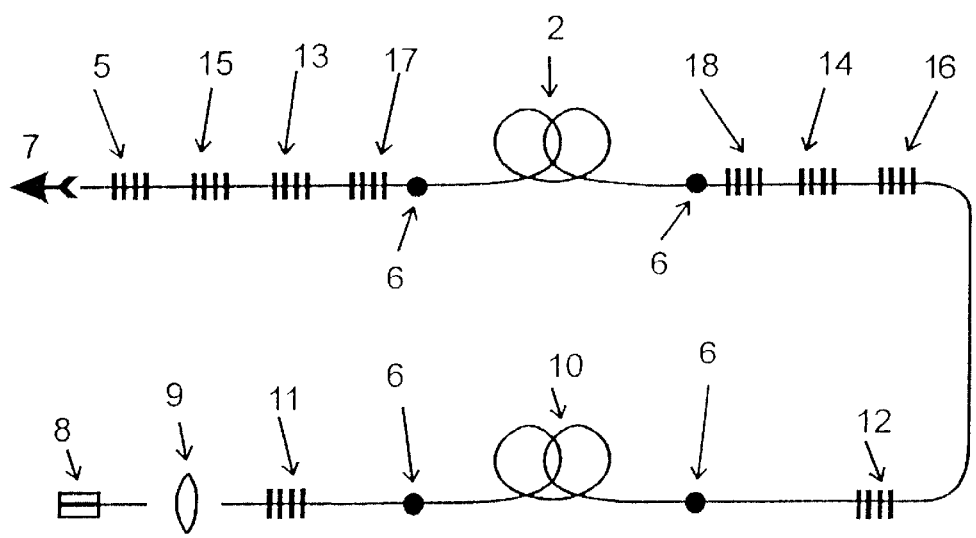
FIG. 2 shows a scheme of a three-stage Raman fiber laser, as an example of realization of the invention.

A more detailed description of the claimed invention a three-stage Raman laser is presented by the example shown in FIG. 2, where the length of the phosphosilicate fiber, designated by reference numeral 2, is the active laser medium of a three-stage Raman laser. In the scheme of FIG. 2, a fiber neodymium laser performs the role of a pumping radiation source for the Raman laser.

In turn, the optical pumping of a neodymium laser is carried out with the aid of an array of laser diodes with a multimode fiber output. Thus, the array of laser diodes with the fiber output 8 is the initial source of pumping radiation for the whole optical scheme shown in FIG. 2. An optical system, by means of which radiation of the array with the fiber output 8 is launched into the first cladding of the active fiber of the neodymium laser (neodymium fiber) 10, is designated by reference numeral 9 in FIG. 2. The resonator of the neodymium fiber laser is formed by reflective elements which are made in the form of refraction index Bragg gratings 11 and 12. The Bragg gratings are included in lengths of a standard Flexcor 1060 fiber (Coming firm, USA) and are welded to the ends of a neodymium fiber (reference numeral 6 designates the welding points of the fibers in FIG. 2).

The Raman fiber laser is made three-stage. The length 2 of the phosphosilicate fiber is a part common to all three resonators. Three pairs of refraction index Bragg gratings performing the role of reflectors forming resonators for each stage are designated by reference numerals 13–14, 15–16 and 17–18, respectively.

Furthermore, an additional Bragg grating 5 is included in the construction of the laser. The parameters of this grating coincide with the parameters of the grating 11. This grating serves to return radiation with a wavelength $\lambda_o$ into the fiber 2 in order to enhance the efficiency of the Raman laser. The point of output of radiation with a converted wavelength $\lambda_3$ from the optical circuit is designated by reference numeral 7.

Radiation from the array of laser diodes with fiber output 8 is a pump for a fiber neodymium laser based on a fiber with a double cladding. (A description of a laser of this type is provided in, for example, E. M. Dianov, A. V. Belov, I. A. Bufetov, V. N. Protopopov, A. N. Gur'yanov, D. D. Gusovskij, S. V. Kobis', "High-power Single-mode Neodymium Fibre Laser," Quantum Electronics, vol. 27, No. 1, pp. 1–2, 1997.) The wavelength of array radiation is 0.805 μm with a spectral width of 3 nm, maximum power 10 W.

As already indicated above, a fiber 10 (neodymium fiber) with a double cladding, the core of which comprises neodymium ions, is the active medium of the fiber neodymium laser. The first cladding of this neodymium fiber is made of silica. The second cladding of the neodymium fiber is made of a polymer with a small refraction index. As a result of this the first cladding of the neodymium fiber is a multimode fiber for radiation from an array of laser diodes.

The Bragg grating 11 has a reflection factor at the generation wavelength of the neodymium laser $\lambda_o$=1062 nm ($\upsilon_o$=9416 $cm^{-1}$) that is close to 100% (more than 98%). The width of the spectral reflection band of this grating is 2 nm (at a level –10 dB). The reflection factor of the Bragg grating 12 at a wavelength of 1062 nm is about 4%, the width of the band 0.5 nm (at the level ½).

As already mentioned, the length 2 of the phosphosilicate fiber is the active laser medium of the three-stage Raman laser. Its core comprises 10 mole % of $P_2O_5$. The fiber is single-mode for optical radiation of all of the used wavelengths. The cut-off wavelength of the second mode of this fiber is 0.9 μm.

The pairs of Bragg gratings 13–14, 15–16 and 17–18, respectively, are included in the lengths of a standard Flexcor 1060 fiber. In each pair both gratings are recorded on one and the same radiation wavelength (with an accuracy up to experimental errors ~0.1 nm and have a reflection spectrum width of ≈0.5 nm.

The pair of gratings 13–14 forms a resonator of the first stage of the Raman laser. They are recorded on a wavelength $\lambda_1$=1236 nm ($\upsilon_1$=8091 $cm^{-1}$). The frequency shift between $\lambda_o$ and $\lambda_1$ corresponds to the Raman phosphorus amplification band (1305–1355 $cm^{-1}$). The gratings 13 and 14 have a high reflection factor (more than 99%).

The pair of gratings 15–16 form a resonator of the second stage of the Raman laser. They are recorded on the wavelength $\lambda_2$=1316 nm ($\upsilon_2$=7600 $cm^{-1}$). The frequency shift between $\lambda_1$ and $\lambda_2$ corresponds to the Raman quartz amplification line (50–560 $cm^{-1}$). Both gratings 15 and 16 have a high reflection factor (more than 99%).

The pair of gratings 17–18 form a resonator of the third stage of the Raman laser. They are recorded on the wavelength $\lambda_3$=1407 nm ($\upsilon_3$=7107 $cm^{-1}$). The frequency shift between $\lambda_2$ and $\lambda_3$ corresponds to the silica Raman amplification band (490 $cm^{-1}$). The grating 18 has a high reflection factor (more than 99%). The Bragg grating 17 has a reflection factor ≈60%. It ensures the optimum output of radiation from the Raman laser resonator.

Figure 3:
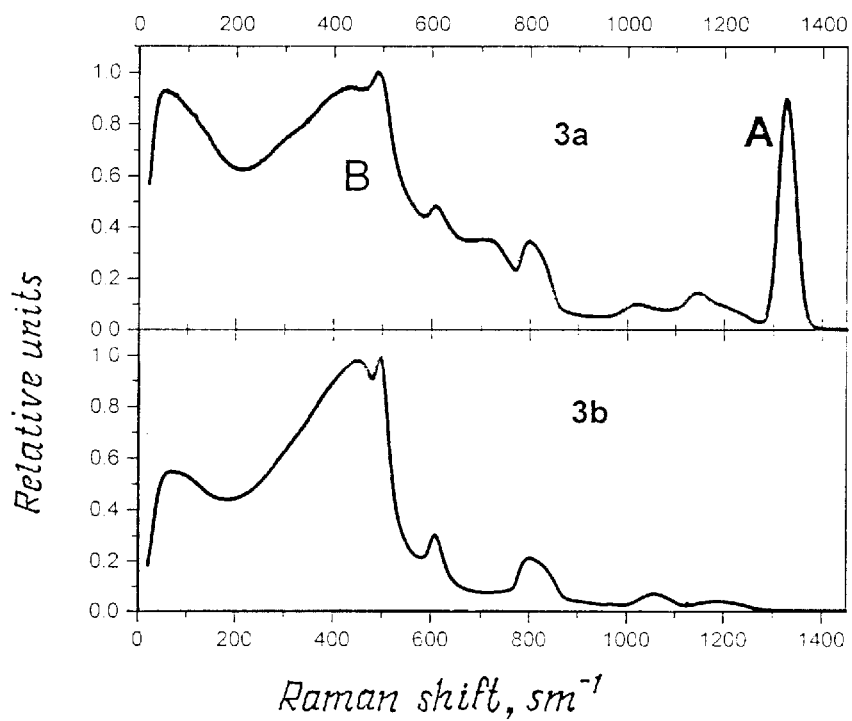
FIG. 3 shows the spectrum of spontaneous Raman scattering in a phosphosilicate fiber (3a) and in a purely silicate fiber (3b).

FIG. 3 shows the spectrum of a spontaneous Raman scattering in a phosphosilicate fiber (3a) and in a pure silica fiber (3b). There are two bands clearly evident in the spectrum of the spontaneous Raman scattering of a phosphosilicate fiber (see FIG. 3, spectrum 3a): a narrow band (band A), encompassing the range of 1305–1355 $cm^{-1}$, related to the presence of phosphorus oxide, and a wider band, contained in the range of 50–560 $cm^{-1}$, related to the presence of silica in the core of the fiber (band B). For comparison, the spectrum of Raman scattering in a fiber with a silica core is shown in FIG. 3, spectrum 3b. Thus, in the described construction of a three-stage Raman laser (the scheme of which is presented in FIG. 2), conversion of the radiation frequency in the first stage is carried out with the use of band A, related to the presence of phosphorus oxide in the fiber. In the other two stages of Raman conversion, band B of the spectrum of Raman scattering of the phosphosilicate fiber, related to a silica base of the fiber, is used.

Figure 4:
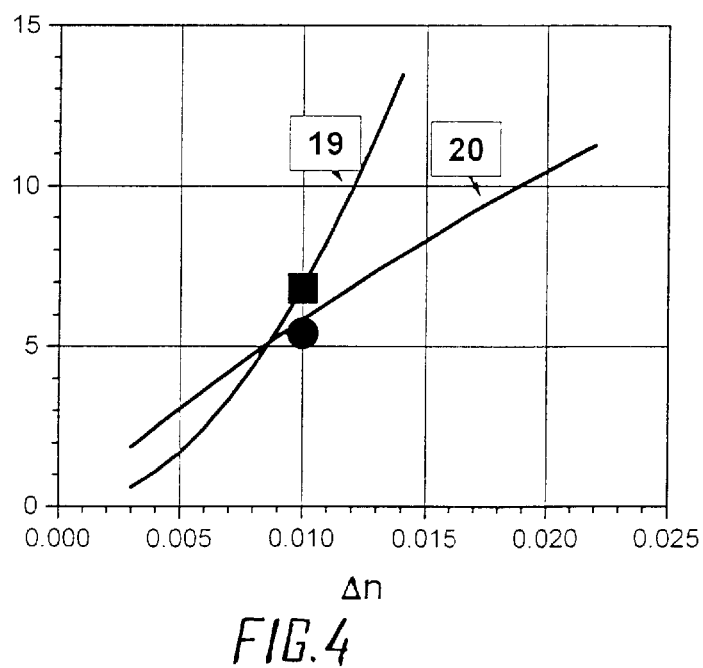
FIG. 4 shows the calculated relationship between the Raman amplification factors corresponding to Stokes shifts of about 440 and 1330 cm$^{-1}$ in a phosphosilicate fiber and the difference between the refractive indicia of the core and the reflecting cladding.

FIG. 4 shows calculated relationships between the Raman amplification factors, corresponding to Stokes shifts of about 440 and 1330 $cm^{-1}$ in a phosphosilicate fiber, and the difference between the refraction indicia of the core of the fiber and the reflecting cladding.

One and the same length of the phosphosilicate fiber is used in all three conversion stages as the amplifying Raman medium in the construction being described. The concentration of phosphorus oxide in the core of that fiber (10 mole %) is selected in such a manner that the Raman amplification factors of the fiber in the peaks of bands A and B are approximately equal. This circumstance is illustrated by the graph in FIG. 4 showing the relationship between the Raman amplification factors and the difference Δn between the refraction indicia of the core and the cladding of the phosphosilicate fiber, and since Δn in that fiber is determined by the concentration of $P_2O_5$, the presented graph simultaneously shows the relationship between the Raman amplification factor and the concentration of $P_2O_5$. FIG. 4 shows the relationship between the Raman amplification factor in a phosphosilicate fiber and Δn in a peak of band A (line 19—calculated values, point ■ corresponds to a measured value in the length 2 of the phosphosilicate fiber which was used in the laser, the scheme of which is shown in FIG. 2) and band B (line 20 —calculated values, the point ● corresponds to a measured value in the length 2 of the phosphosilicate fiber). The Raman amplification factors of the used fiber were equal to 6.8 dB/(km W) and 5.5 dB/(km W) in bands A and B, respectively.

Figure 5:
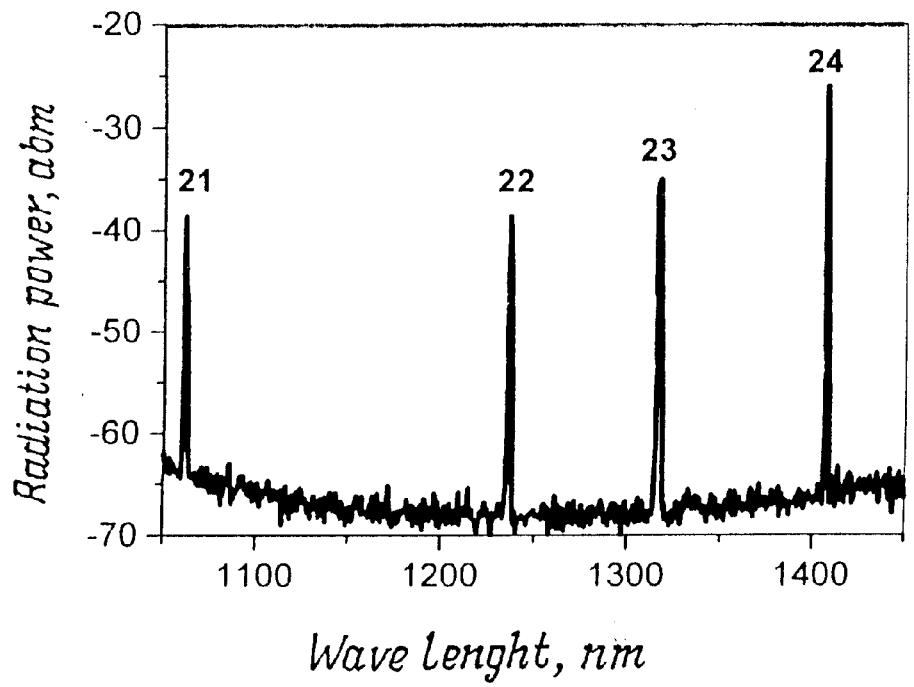
FIG. 5 shows the spectrum of the radiation at the output of a three-stage Raman fiber laser, the scheme of which is shown in FIG. 2.

The spectrum of radiation at the output of the Raman fiber laser according to FIG. 2 is shown in FIG. 5. As shown in FIG. 5, radiation of all of the wavelengths used in the scheme is observed at the output 7 of the Raman laser. The peak 21 corresponds to the pumping wavelength $\lambda_o$, the peak 22 to the wavelength of the first Stokes component $\lambda_1$, peak 23 to the wavelength of the second Stokes component $\lambda_2$, peak 24 to the wavelength of the third Stokes component $\lambda_3$. Values of that part of the radiation power, which was diverted to the spectrum analyzer, are indicated along the vertical axis in the graph shown in FIG. 5. The radiation power at a wavelength of 1407 nm is greater by more than an order of magnitude as compared with the power of any of the preceding components.

Figure 6:
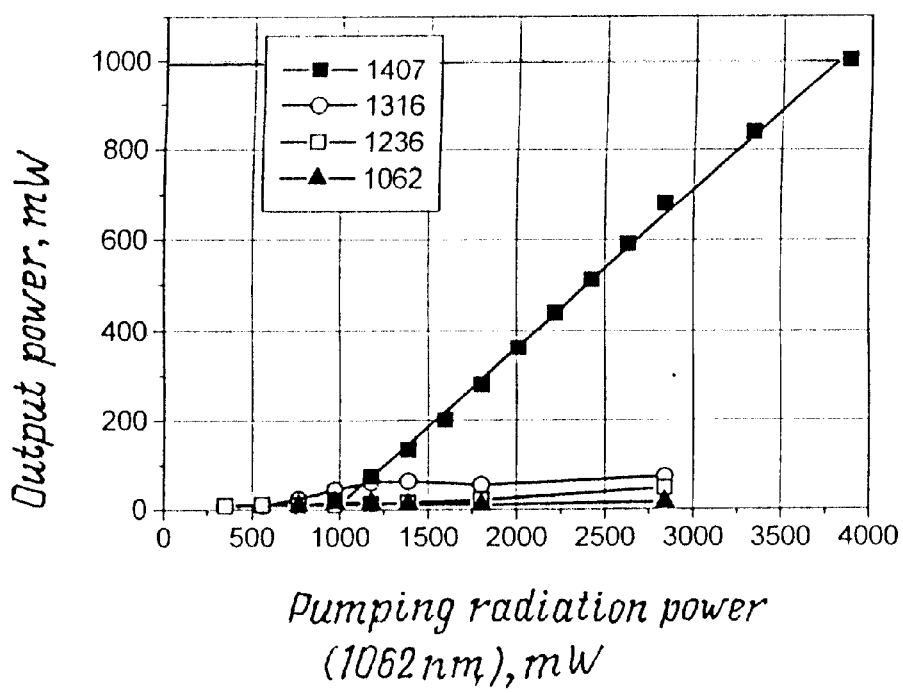
FIG. 6 shows the relationship between the radiation power at the output of a three-stage Raman laser, the scheme of which is shown in FIG. 2, at the wavelengths of all three Raman resonators and at the wavelength of pumping radiation, and the pumping radiation power at the input to the portion of the phosphosilicate fiber.

FIG. 6 shows the relationships between the radiation power at wavelengths of $\lambda_o$, $\lambda_1$, $\lambda_2$ and $\lambda_3$ at the output of the Raman laser, the scheme of which is shown in FIG. 2, and the pumping radiation power at the input to the phosphosilicate fiber. The output power of a three-stage Raman laser at a wavelength $\lambda_3$=1407 nm reaches 1 W (see FIG. 6), wherein the power differential efficiency is 36% and, accordingly, the quantum 47%.

A description of the operation of the present invention will be given below with an example of the operation of a preferable variant of realization of the invention, in particular a three-stage Raman fiber laser. In accordance with FIG. 2, a three-stage Raman fiber laser operates in the following manner.

Radiation from the array 8 of laser diodes (wavelength 0.805 μm) is absorbed by neodymium ions which are in the core of the neodymium fiber 10. As a result the condition for generation is achieved in the neodymium laser formed by the neodymium fiber 10 and the reflecting elements in the form of Bragg gratings 11 and 12. Radiation from the neodymium laser with a wavelength $\lambda_0$ is emitted from a laser resonator from the side of the Bragg grating 12 and via the Bragg gratings 16, 14 and 18 (which are transparent for radiation with a wavelength $\lambda_o$) and enters the length 2 of the phosphosilicate fiber and causes the effect of spontaneous and stimulated Raman scattering in that fiber. The Bragg grating 5 returns radiation with a wavelength $\lambda_o$ which is unabsorbed in the length 2 of the phosphosilicate fiber, back into the length 2 of the phosphosilicate fiber. In the case of weak absorption of radiation with $\lambda_o$ in the length 2 of the phosphosilicate fiber, the Bragg grating 5, the reflection factor of which is close to 100%, performs the role of a second reflector in the resonator of the neodymium laser. When the radiation power with the wavelength $\lambda_0$ reaches the threshold value, generation begins due to the effect of stimulated Raman scattering in the resonator formed by the length 2 of the phosphosilicate fiber and the Bragg gratings 13 and 14 at the wavelength $\lambda_1$—radiation of the first Stokes component (the first stage of radiation frequency conversion). The length 2 of the phosphosilicate fiber is also a part of the optical resonators operating at wavelengths $\lambda_2$ and $\lambda_3$, which are formed by pairs of Bragg gratings 15–16 and 17–18. Radiation of the first Stokes component, in turn, causes the effect of spontaneous and stimulated Raman scattering in length 2 of the phosphosilicate fiber, which upon reaching the threshold radiation power with a wavelength $\lambda_1$ in the length 2 of the phosphosilicate fiber results in the initiation of generation of radiation with a wavelength $\lambda_2$ (the second Stokes component) in the resonator formed by length 2 of the phosphosilicate fiber and the pair of Bragg gratings 15 and 16 (the second conversion stage). Similarly, radiation of the second Stokes component also causes the spontaneous and stimulated Raman scattering in length 2 of the phosphosilicate fiber, which upon reaching the threshold radiation power with a wavelength $\lambda_2$ in the length 2 of the phosphosilicate fiber results in the initiation of generation of radiation with a wavelength $\lambda_3$ (third Stokes component) in the resonator formed by length 2 of the phosphosilicate fiber and the pair of Bragg gratings 17 and 18 (third conversion stage). As distinctive from the preceding resonators, the Bragg grating 17 has a lesser reflection factor than the Bragg grating of the preceding stages in order to ensure the effective emission of radiation with wavelength 3 from the resonator of the third stage.

In spite of the fact that different variants of realization of both the proposed Raman fiber laser and its structural elements have been given consideration in the presented description, this was done in order to illustrate the possibility of introducing a number of changes in its embodiment without going beyond the limits of the broad scope of the claimed features. The scope of the claimed features of the present invention is only limited by the set of claims.

INDUSTRIAL APPLICABILITY

The proposed invention may be used in fiber communication systems for pumping optical amplifiers that are used in wide band fiber-optical communication systems, and also in fields where the spectral-selective action of radiation on a substance in the near IR range is required, in particular in medicine, diagnosis of the environment, in chemistry.

What is claimed is:

1. A Raman fiber laser comprising:
    a length of a phosphosilicate fiber as the active medium, the makeup of the fiber including $SiO_2$ and $P_2O_5$;
    a pumping source of optical radiation with a frequency of $\upsilon_o$;
    at least two pairs of Bragg gratings as reflectors;
    wherein each said pair of Bragg gratings forms an optical resonator including at least a portion of the phosphosilicate fiber;
    wherein the frequency $\upsilon_o$ of said pumping source of optical radiation and a frequency of each optical resonator $\upsilon_i$, where i=1, ... ,N, are set in such a manner that a part of the values of the frequency differences $\Delta\upsilon_i = \upsilon_{i-1} - \upsilon_i$ belongs to a range of 1305–1355 $cm^{-1}$, Raman amplification which is due to the presence $P_2O_5$ in the phosphosilicate fiber, while the remaining values of the frequency differences $\Delta\upsilon_i$ belong to a range of 50–560 $cm^{-1}$, Raman amplification which is due to the presence of $SiO_2$ in the phosphosilicate fiber, wherein there is at least one value of $\Delta\upsilon_i$ in each of the $P_2O_5$ and $SiO_2$ ranges.

2. A Raman fiber laser according to claim 1, wherein an additional Bragg grating with a radiation reflection factor at the frequency $\upsilon_o$ greater than 50% is disposed at an output of the Raman fiber.

3. A Raman fiber laser according to claim 1, wherein said pumping radiation source is made in a form of a neodymium fiber laser with the frequency $\upsilon_o$ selected from the group of ranges consisting of 8930–9489 $cm^{-1}$, 10820–10870 $cm^{-1}$ and 7400–7700 $cm^{-1}$.

4. A Raman fiber laser according to claim 1, wherein said pumping radiation source is made in a form of an ytterbium fiber laser with the frequency $\upsilon_o$ selected from the range consisting of 8900–10000 $cm^{-1}$.

5. A Raman fiber laser according to claim 1, wherein a concentration of $P_2O_5$ in a core of said length of the phosphosilicate fiber lies within a range of 8–15 mole %.

6. A Raman fiber laser according to claim 1, wherein a compound of at least one chemical element selected from the group consisting of Ge, N, Ga, Al, F, Ti, B, Sn and S, is additionally introduced into the makeup of said length of the phosphosilicate fiber.

* * * * *